J. H. FINCH.
Coffee Pot.
No. 91,320.
Patented June 15, 1869.
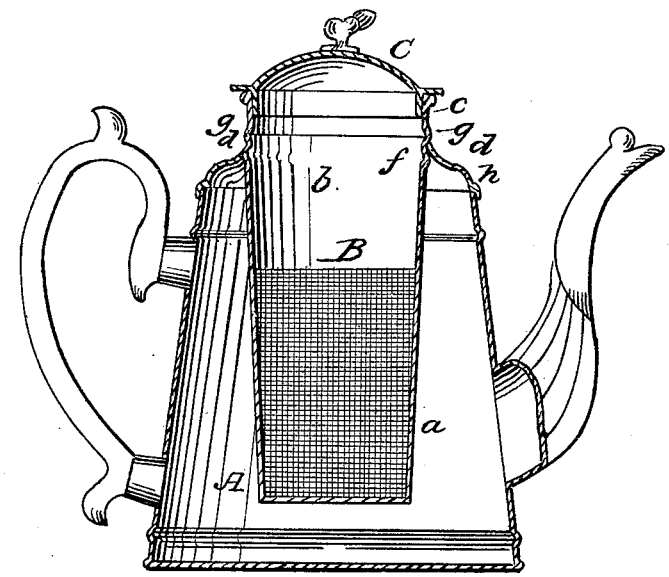
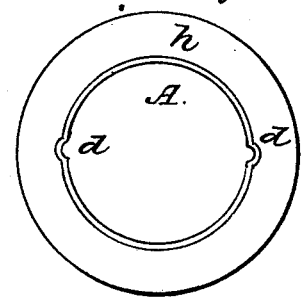
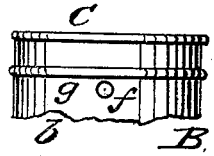

United States Patent Office.

JOSEPH H. FINCH, OF ROCHESTER, NEW YORK.

*Letters Patent No. 91,320, dated June 15, 1869.*

IMPROVEMENT IN TEA AND COFFEE-POTS.

The Schedule referred to in these Letters Patent and making part of the same.

*To all whom it may concern:*

Be it known that I, JOSEPH H. FINCH, of the city of Rochester, county of Monroe, and State of New York, have invented a certain new and useful Improvement in Tea and Coffee-Pots; and I do hereby declare that the following is a full and exact description thereof, reference being had to the accompanying drawings, making a part of this specification, in which—

Figure 1 is a central vertical section of my improved pot.

Figure 2, a plan of the pot, with the receptacle removed.

Figure 3, an elevation of the upper portion of the receptacle.

Like letters of reference indicate corresponding parts in all the figures.

My improvement belongs to that class of tea and coffee-pots having a central perforated receptacle or reservoir extending down from the top of the pot, and retaining the tea or coffee-grounds from passing out and clogging the spout.

The invention consists in extending the top of the receptacle above the top of the pot, and securing it in place by a peculiar fastening, as hereinafter set forth.

In the drawings—

A indicates a tea or coffee-pot, of ordinary form; and

B indicates the centre receptacle or reservoir which sets therein.

The lower portion $a$ of the receptacle is perforated, to allow a free circulation of the water through, while the upper portion $b$ is nonperforated, as shown.

In ordinary pots of this kind, the top of the receptacle rests closely upon or within the mouth of the pot. Instead of this, I extend the top $c$ some distance above the top of the pot, and simply insert the cover C in the top of the receptacle.

By this projection of the receptacle, I claim a special advantage, inasmuch as it allows a greater freedom of access, and also enables the receptacle to be inserted or removed with the greatest facility and ease, thereby avoiding any objection common to devices of this class. It also gives a more symmetrical appearance.

In order to insert or remove at pleasure, I employ a peculiar fastening, consisting of notches $d\ d$, in the mouth of the pot, and lugs $f\ f$, struck out from the body of the receptacle, which fit therein, and a bead, $g$, above, which strikes down upon the upper rim $h$ of the mouth.

When the lugs are inserted in the notch, they are simply turned to the proper position to hold under the rim $h$, and at the same time the bead $g$, striking down upon the rim, the receptacle is held rigidly and stiffly in place, so that the perforated portion is always centred in the pot, to get the best effect of the circulation of the water.

The bead, by bearing all the way round on top, acts specially to produce this effect, as it is then only necessary for the lugs to draw tightly down.

This fastening has a special relation to the elevated receptacle, since without the projection, the bead could not be formed.

This fastening is also particularly adapted to tea and coffee-pots, since the notches $d\ d$ can be easily cut in the mouth, and the lugs and bead as easily struck from the sides of the receptacle.

I am aware that receptacles have before been combined with a tea or coffee-pot resting closely on top or within the mouth; such broadly I do not claim.

What I claim as my invention, and desire to secure by Letters Patent, is—

The inwardly-curved top of the pot A, having notches $d$, when employed in connection with the partly-enclosed and projecting receptacle B, having bead $g$ and lug $f$, whereby, when the parts are locked, the bead rests on the upper edge of the curved top, with the lugs $f$ beneath it, for the purpose and in the manner described.

In witness whereof, I have hereunto signed my name, in the presence of two subscribing witnesses.

J. H. FINCH.

Witnesses:
R. F. OSGOOD,
GEO. W. MIATT.